US009774287B1

(12) United States Patent
Simili et al.

(10) Patent No.: US 9,774,287 B1
(45) Date of Patent: Sep. 26, 2017

(54) MODIFICATION OF STATOR CURRENT FOR ENHANCED FLUX WEAKENING

(71) Applicant: GM GLOBAL TECHNOLOGY OPERATIONS LLC, Detroit, MI (US)

(72) Inventors: Dwarakanath V. Simili, Oakland Township, MI (US); Bon Ho Bae, Novi, MI (US); Aayush Gupta, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/210,179

(22) Filed: Jul. 14, 2016

(51) Int. Cl.
  *H02P 21/00* (2016.01)
  *H02K 1/14* (2006.01)
  *H02K 1/27* (2006.01)

(52) U.S. Cl.
  CPC ......... *H02P 21/0089* (2013.01); *H02K 1/146* (2013.01); *H02K 1/2706* (2013.01)

(58) Field of Classification Search
  USPC .... 318/432, 400.02, 400.07, 400.12, 400.15, 318/799, 809
  See application file for complete search history.

(56) References Cited

U.S. PATENT DOCUMENTS

| 7,023,168 B1 | 4/2006 | Patel et al. |
| 2008/0111516 A1* | 5/2008 | Inokuma ................. H02P 21/14 318/799 |

(Continued)

OTHER PUBLICATIONS

Bolognani, Calligaro, Petrella; "Adaptive Flux-Weakening Controller for Interior Permanent Magnet Synchronous Motor Drives"; IEEE vol. 2, No. 2, Jun. 2014, 2168-6777.

*Primary Examiner* — Jorge L Carrasquillo
(74) *Attorney, Agent, or Firm* — Quinn IP Law

(57) ABSTRACT

An electric machine assembly includes an electric machine having a stator configured to have a stator current and a controller configured to receive a torque command (T). The controller has a processor and tangible, non-transitory memory on which is recorded instructions for executing a method of modifying the stator current for enhanced flux weakening. The controller is programmed to obtain a base stator current $[I_d^{LU}, I_q^{LU}]$ from a look-up table based at least partially on the torque command (T). The controller is programmed to obtain a characteristic angle ($\theta_i$, i=1, 2, 3) based at least partially on a value of the torque command (T) and the base stator current $[I_d^{LU}, I_q^{LU}]$. A stator current modifier $[\Delta I_d, \Delta I_q]$ is obtained based at least partially on the characteristic angle ($\theta_i$, i=1, 2, 3) and a flux weakening factor ($\Delta I_S$) such that: $\Delta I_d = (\Delta I_S * \text{cosine}(\theta_i))$ and $\Delta I_q = (\Delta I_S * \text{sine}(\theta_i))$.

17 Claims, 2 Drawing Sheets

(56) References Cited

U.S. PATENT DOCUMENTS

| | | | | |
|---|---|---|---|---|
| 2008/0265809 A1* | 10/2008 | Ol | .................. | H02P 21/0003 |
| | | | | 318/139 |
| 2014/0238769 A1* | 8/2014 | Tamaizumi | .............. | B62D 6/04 |
| | | | | 180/446 |
| 2014/0336878 A1* | 11/2014 | Yanai | .................... | G01D 5/145 |
| | | | | 701/41 |

* cited by examiner

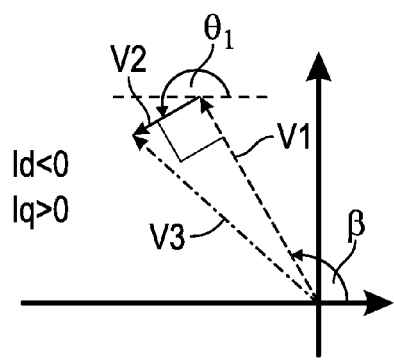
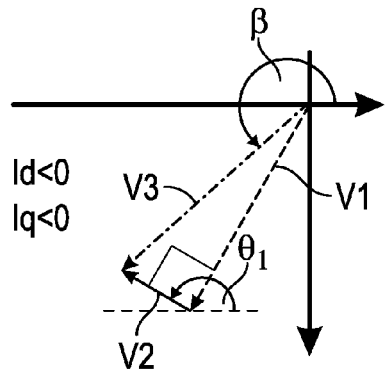
FIG. 3A    FIG. 3B
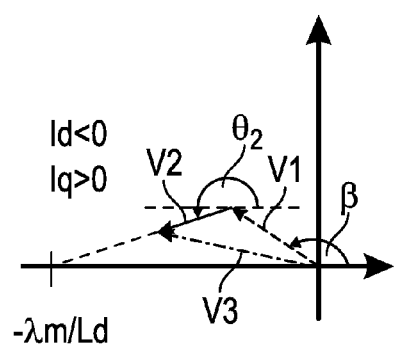
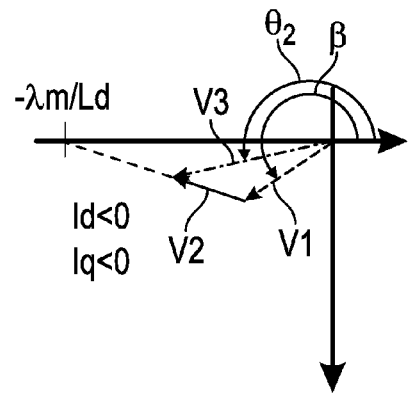
FIG. 4A    FIG. 4B
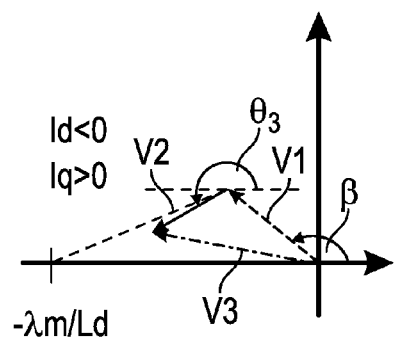
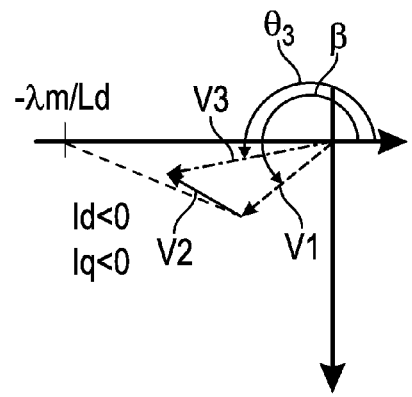
FIG. 5A    FIG. 5B

MODIFICATION OF STATOR CURRENT FOR ENHANCED FLUX WEAKENING

TECHNICAL FIELD

The disclosure relates generally to modification of stator current for enhanced flux weakening in an electric machine assembly.

BACKGROUND

An electric machine, such as an interior permanent magnet machine, includes a rotor having a plurality of permanent magnets of alternating polarity. The rotor is rotatable within a stator which generally includes multiple stator windings and magnetic poles of alternating polarity. Reducing the magnetic flux inside the electric machine at higher speeds improves power characteristics of the electric machine.

SUMMARY

An electric machine assembly includes an electric machine having a stator configured to have a stator current. A controller is operatively connected to the electric machine and is configured to receive a torque command (T). The controller has a processor and tangible, non-transitory memory on which is recorded instructions for executing a method of modifying the stator current for enhanced flux weakening. Execution of the instructions by the processor causes the controller to obtain a base stator current $[I_d^{LU}, I_q^{LU}]$ from a look-up table based at least partially on the torque command (T). The controller is programmed to obtain a characteristic angle ($\theta_i$, i=1, 2, 3) based at least partially on the torque command (T) and the base stator current $[I_d^{LU}, I_q^{LU}]$.

The controller is programmed to obtain a stator current modifier $[\Delta I_d, \Delta I_q]$ based at least partially on the characteristic angle ($\theta_i$, i=1, 2, 3) and a flux weakening factor ($\Delta I_S$). The stator current modifier $[\Delta I_d, \Delta I_q]$ may be defined as: $\Delta I_d = (\Delta I_S * \cosine(\theta_i))$ and $\Delta I_q = (\Delta I_S * \sine(\theta_i))$. The controller is operative to control at least one operating paramater of the electric machine based at least partially on the stator current modifier $[\Delta I_d, \Delta I_q]$. Enhancing the flux weakening achieves improved high speed current control and improved motor torque linearity. The method enhances magnetic flux weakening beyond the weakening associated with voltage constraints in the electric machine.

The characteristic angle ($\theta_i$, i=1, 2, 3) may be at least one of a first characteristic angle ($\theta_1$), a second characteristic angle ($\theta_2$) and a third characteristic angle ($\theta_3$). If the torque command (T) is greater than a high torque threshold ($T_H$), the controller is programmed to obtain a first characteristic angle ($\theta_1$) defined as: $\theta_1 = (\beta \pm 90)$, such that $\beta = $ a tan $2[I_q^{LU}, I_d^{LU}]$. If magnitude of the torque command is less than a low torque threshold ($T_L$), the controller is programmed to obtain a second characteristic angle ($\theta_2$) defined as: $\theta_2 = $ a tan $2[I_q^{LU}, (I_d^{LU} - (\lambda_m/L_d))]$, such that $\lambda_m$ is a magnetic flux and $L_d$ is a d-axis inductance. If the torque command is between the low torque threshold ($T_L$) and the high torque threshold ($T_H$), inclusive, the controller is programmed to obtain a third characteristic angle ($\theta_3$) based at least partially on the first characteristic angle ($\theta_1$), the second characteristic angle ($\theta_2$) and a ratio R, such that $R=(|T|-T_L)/(T_H-T_L)$ and $\theta_3=[R*\theta_1+(1-R)*\theta_2]$.

The magnetic flux ($\lambda_m$) may be obtained from a look-up table based at least partially on data from a rotor temperature sensor operatively connected to the controller. The controller may be further programmed to obtain a modified stator current $[I_d^N, I_q^N]$, based at least partially on the stator current modifier $[\Delta I_d, \Delta I_q]$ and the base stator current $[I_d^{LU}, I_q^{LU}]$ such that $I_d^N=(I_d^{LU}+\Delta I_d)$ and $I_q^N=(I_q^{LU}+\Delta I_q)$. The flux weakening factor ($\Delta I_S$) may be obtained based at least partially on the torque command (T) and a DC link voltage. Obtaining the flux weakening factor ($\Delta I_S$) may include generating respective d-axis and q-axis command voltages based on the torque command (T) and a DC link voltage. A voltage magnitude is generated based on the respective d-axis and q-axis command voltages. The flux weakening factor ($\Delta I_S$) may be generated based on a comparison of the voltage magnitude and a predefined reference voltage.

A battery pack may be operatively connected to the controller and configured to provide the DC link voltage. A pulse-width-modulator (PWM) inverter may be operatively connected to the controller and the battery pack.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 3A and 3B are example schematic illustrations of a first characteristic angle ($\theta_1$) employed in the method of FIG. 2;

FIGS. 4A and 4B are example schematic illustrations of a second characteristic angle ($\theta_2$) employed in the method of FIG. 2; and FIGS. 5A and 5B are example schematic illustrations of a third characteristic angle ($\theta_3$) employed in the method of FIG. 2.

DETAILED DESCRIPTION

Figure 1:
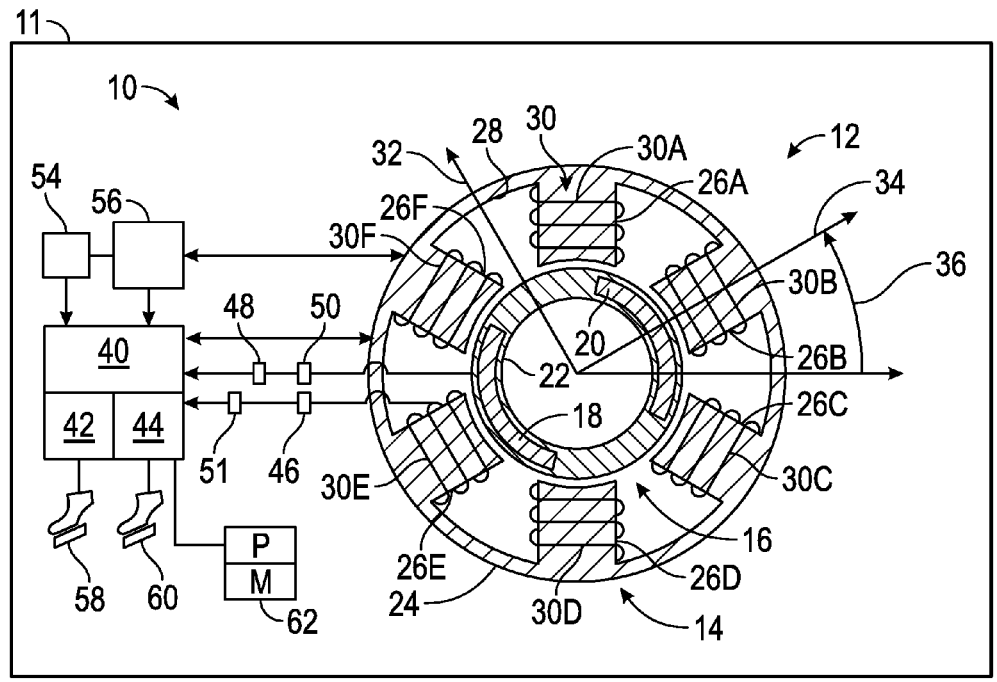
FIG. 1 is a schematic fragmentary partly sectional view of an electric machine assembly having an electric machine and a controller.

Referring to the drawings, wherein like reference numbers refer to like components, FIG. 1 schematically illustrates an electric machine assembly 10. The assembly 10 includes an electric machine 12. The assembly 10 may be a component of a device 11. The device 11 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or any other transportation device. The device 11 may be a non-mobile platform. The device 11 may take many different forms and include multiple and/or alternate components and facilities.

Referring to FIG. 1, the electric machine 12 includes a stator 14 and a rotor 16. The rotor 16 may include a first permanent magnet 18 and a second permanent magnet 20 of alternating polarity around the outer periphery of a rotor core 22. The rotor 16 may include any number of permanent magnets; for simplicity only two are shown. The rotor 16 is rotatable at a rotor speed ($\omega$) within the stator 14. While the embodiment shown in FIG. 1 illustrates a three-phase, single pole-pair (i.e. two pole) machine, it is understood that any number of phases or pole pairs may be employed.

The stator 14 includes a stator core 24 which may be cylindrically shaped with a hollow interior. The stator core 24 may include a plurality of inwardly-protruding stator teeth 26A-F, separated by gaps or slots 28. In the embodiment shown in FIG. 1, stator windings 30 may be operatively connected to the stator core 24, such as for example, being coiled around the stator teeth 26A-F. The electric machine 12 may be of any type, including, but not limited to, induction and synchronous machines. While an example electric machine 12 is shown in the Figures, the components illustrated in the Figures are not intended to be limiting. Indeed, additional or alternative components and/or implementations may be used.

The stator 14 is configured to have electric current, referred to herein as stator current, flowing in the stator windings 30 and causing a rotating magnetic field in the stator 14. Referring to FIG. 1, the stator windings 30 may include six sets of windings; one set for each of three phases (the first phase through stator windings 30A and 30D, the second phase through stator windings 30B and 30E and the third phase through stator windings 30C and 30F). Alternatively, slip rings or brushes (not shown) may be employed. Referring to FIG. 1, a quadrature (q) magnetic axis 32 and a direct (d) magnetic axis 34 are shown. The first and second permanent magnets 18, 20 aid in the creation of a magnetic field and magnetic flux ($\lambda_m$).

Referring to FIG. 1, the assembly 10 includes a controller 40 operatively connected to or in electronic communication with the electric machine 12. The controller 40 is configured to receive a torque command (T). Referring to FIG. 1, the controller 40 includes at least one processor 42 and at least one memory 44 (or any non-transitory, tangible computer readable storage medium) on which are recorded instructions for executing method 100, shown in FIG. 2, of modifying the stator current for enhanced flux weakening. The memory 44 can store controller-executable instruction sets, and the processor 42 can execute the controller-executable instruction sets stored in the memory 44.

The controller 40 of FIG. 1 is specifically programmed to execute the blocks of the method 100 (as discussed in detail below with respect to FIG. 2) and can receive inputs from various sensors. Referring to FIG. 1, the assembly 10 may include a stator winding temperature sensor 46, a rotor temperature sensor 48, a magnetic flux sensor 50, each capable of measuring a respective physical factor and sending a respective signal to the controller 40. Additionally, controller 40 may be programmed to determine the respective physical factors by modeling or any other estimation technique known to those skilled in the art. The assembly 10 may include a rotor position transducer 51 that measures the position of the rotor 16 and generates a rotor position signal. A battery pack 54 may be operatively connected to the electric machine 12 as a source of DC link voltage. A pulse-width-modulated (PWM) inverter 56 may be operatively connected to the controller 40 and battery pack 54, and configured to convert DC to AC current.

The method 100 enhances magnetic flux weakening beyond the flux weakening associated with voltage and current constraints in the electric machine 12. The method 100 improves functioning of the assembly 10 by enabling transition in and out of a six-step pulse-width-modulation (PWM) operation mode based on operating conditions of the electric machine 12 or in steady state during the six-step pulse-width-modulation (PWM) operation. As understood by those skilled in the art, a six-step pulse-width-modulation (PWM) operation is a mode of operation wherein the voltage vector is applied at six intervals (for a 3 phase inverter) during one fundamental cycle (i.e. electrical speed). The six-step pulse-width-modulation (PWM) operation is a desired mode of operation for increasing the efficiency of the assembly 10 (electric machine 12 plus the pulse-width-modulation (PWM) inverter 56) at low to light load or torque conditions and for increasing voltage utilization to increase peak torque of the electric machine 12. The six-step pulse-width-modulation (PWM) operation is employed in a high speed region from zero torque to the peak torque capability of the electric machine 12. During these modes of operation, the method 100 also ensures torque accuracy along a constant torque curve.

Figure 2:
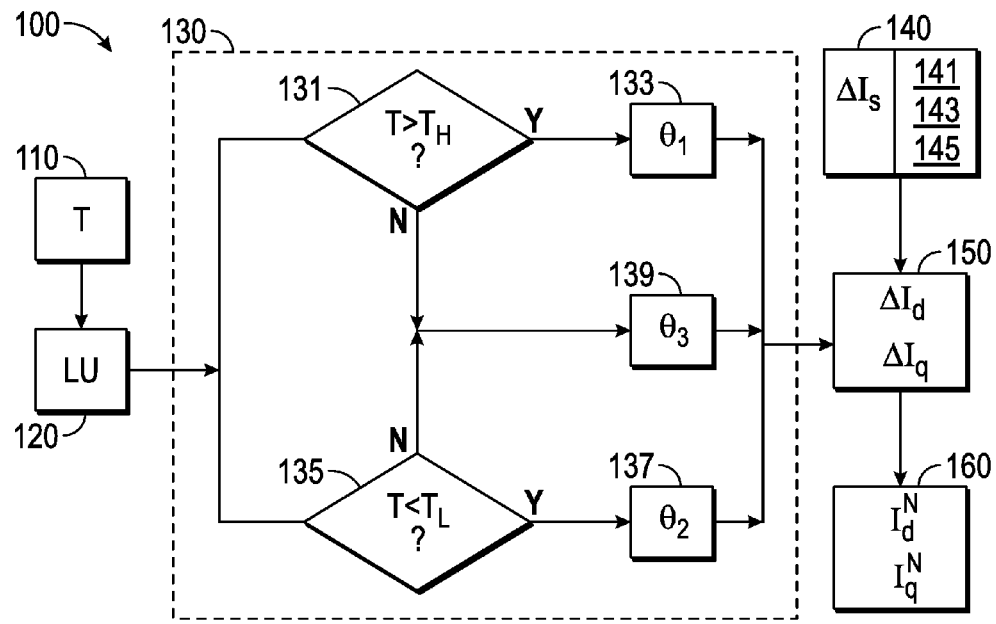
FIG. 2 is a flowchart for a method executable by the controller of FIG. 1.

Referring now to FIG. 2, a flowchart of the method 100 stored on and executable by the controller 40 of FIG. 1 is shown. Method 100 need not be applied in the specific order recited herein. Furthermore, it is to be understood that some blocks may be eliminated. Referring to FIG. 2, method 100 may begin with block 110, where the controller 40 is programmed or configured to receive a torque command (T). The torque command (T) may be received by the controller 40 in response to an operator input or an automatically-fed input condition monitored by the controller 40. If the device 11 is a vehicle, the controller 40 may determine the torque command (T) based on input signals from an operator through an accelerator pedal 58 and brake pedal 60, shown in FIG. 1.

In block 120 of FIG. 2, the controller 40 is configured to obtain a base stator current [$I_d^{LU}, I_q^{LU}$] from a look-up table based at least partially on the torque command (T). The term "look-up table" is intended to represent any type of table, data repository or data storage known to those skilled in the art. The look-up table may be obtained in a testing dynamo or lab conditions.

In block 130 of FIG. 2, the controller 40 is programmed to obtain a characteristic angle ($\theta_i$, i=1, 2, 3) based at least partially on a value of the torque command (T) and the base stator current [$I_d^{LU}, I_q^{LU}$]. The characteristic angle ($\theta_i$, i=1, 2, 3) may be at least one of a first characteristic angle ($\theta_1$), a second characteristic angle ($\theta_2$) and a third characteristic angle ($\theta_3$). Block 130 includes sub-blocks 131, 133, 135, 137 and 139, described below.

In sub-block 131, the controller 40 is programmed to determine if the torque command (T) is greater than a high torque threshold ($T_H$). If the torque command (T>$T_H$) is greater than the high torque threshold ($T_H$), the method 100 proceeds to sub-block 133. In sub-block 133 (T>$T_H$), the controller 40 is programmed to obtain a first characteristic angle ($\theta_1$) defined as:

$\theta_1 = (\beta \pm 90)$, such that $\beta = a \tan 2(I_q^{LU}, I_d^{LU})$.

When $I_d < 0, I_q > 0, \theta_1 = (\beta + 90)$ and $\beta = a \tan 2(I_q^{LU}, I_d^{LU})$.

When $I_d < 0, I_q < 0, \theta_1 = (\beta - 90)$ and $\beta = a \tan 2(I_q^{LU}, I_d^{LU})$.

As understood by those skilled in the art, a tan 2 is a math function for the four-quadrant arc tangent inverse whose values are bound from $-\pi$ to $\pi$. A tan 2 is the inverse tangent function with two factors such as (A, B), for example. A tan 2 (A, B) may be defined as the angle in radians between the positive $I_d$ axis and the point given by the coordinates (A, B) on it. The angle is positive for counter-clockwise angles (upper half-plane, $I_q > 0$), and negative for clockwise angles (lower half-plane, $I_q < 0$).

In sub-block 135, the controller 40 is programmed to determine if the torque command (T) is less than a low torque threshold ($T_L$). If the torque command (T) is less than the low torque threshold ($T_L$), the method 100 proceeds to sub-block 137. In sub-block 137 (T<$T_L$), the controller is programmed to obtain a second characteristic angle ($\theta_2$) defined as:

$$\theta_2 = a\tan 2[I_q^{LU},(I_d^{LU}-(\lambda_m/L_d))].$$

Here $\lambda_m$ is a magnetic flux and $L_d$ is a d-axis inductance of the stator windings 30. The $I_d^{LU}$ term may be a negative value. The magnetic flux ($\lambda_m$) may be estimated via any modeling or estimation method known to those skilled in the art or may be set to a pre-determined constant value. For example, the magnetic flux ($\lambda_m$) may be obtained from a pre-determined look up table as a function of rotor temperature. The rotor temperature may be estimated via a machine thermal estimator model running in the controller with inputs such as voltage, motor speed, stator currents, coolant temperature, coolant flow rates and others. The magnetic flux ($\lambda_m$) may be obtained via a flux observer or any other method known to those skilled in the art.

The inductance ($L_d$) may be obtained as a function of the number of turns (N) in the stator winding, the relative permeability of the winding core material ($\mu$), the area of the winding/coil in square meters and the average length of the winding/coil in meters (l), such that: $L_d = (N^2 * \mu * A/l)$. The inductance ($L_d$) of the stator winding 30 may be obtained by any method known to those skilled in the art.

If the torque command (T) is neither greater than the high torque threshold ($T_H$) nor less than a low torque threshold ($T_L$), i.e., the torque command is between the low torque threshold ($T_L$) and the high torque threshold ($T_H$), inclusive, the method 100 proceeds to sub-block 139. In sub-block 139 ($T_L<T<T_H$), the controller 40 is programmed to obtain a third characteristic angle ($\theta_3$) based at least partially on the first characteristic angle ($\theta_1$), the second characteristic angle ($\theta_2$) and a ratio R, such that:

$$R = (|T|-T_L)/(T_H-T_L); \text{ and}$$

$$\theta_3 = [R*\theta_1 + (1-R)*\theta_2].$$

FIGS. 3A, 4A and 5A are example schematic illustrations of the first, second and third characteristic angles, respectively, in a motoring mode, i.e., second quadrant ($I_d<0$, $I_q>0$). FIGS. 3B, 4B and 5B are example schematic illustrations of the first, second and third characteristic angles, respectively, in a regenerating mode, i.e., third quadrant ($I_d<0$, $I_q<0$). In each of FIGS. 3A, B-5A,B, the vertical axis represents the stator current for the q-axis ($I_q$) and the horizontal axis represents the stator current for the d-axis ($I_d$). The ratio $-(\lambda_m/L_d)$ is marked on the horizontal axis in FIGS. 4A,B and 5A, B. The base stator current [$I_d^{LU}$, $I_q^{LU}$] (obtained in block 120) is shown as vector V1 in each of the figures. The flux weakening factor ($\Delta I_S$) (obtained in block 160, described below) is shown as vector V2 in each of the figures. The modified stator current [$I_d^N$, $I_q^N$] (obtained in block 160, described below) is shown as vector V3 in each of the figures.

Referring now to block 140 of FIG. 2, the controller 40 is programmed to obtain a flux weakening factor ($\Delta I_S$), based at least partially on the voltage constraints of the electric machine 12. Block 140 may include sub-blocks 141, 143, 145 described below. The flux weakening factor ($\Delta I_S$) may be obtained as an output of any flux weakening control module known to those skilled in the art. The assembly 10 may include a proportional-integral (PI) regulator 62 (having a processor P and memory M) for determining the flux weakening factor ($\Delta I_S$). In other words, the blocks 141, 143 and 145 may be executed by the proportional-integral (PI) regulator 62. The proportional-integral (PI) regulator 62 may be operatively connected to the controller 40 or may be an integral part of the controller 40.

In sub-block 141, the controller 40 is programmed to generate respective d-axis and q-axis command voltages ($V^*_d$, $V^*_q$) based on the torque command (T) and a DC link voltage ($V_{dc}$). The DC link voltage ($V_{dc}$) may be provided by the battery pack 54. The controller 40 may rely on a look-up table or data repository generated in a dynamo or test cell conditions or nay other method known to those skilled in the art. In sub-block 143, the controller 40 is programmed to generate a voltage magnitude ($V_m$) based on the d-axis and q-axis command voltages ($V^*_d$, $V^*_q$). In sub-block 145, the controller 40 is programmed to generate the flux weakening factor ($\Delta I_S$) on a comparison of the voltage magnitude and a predefined reference voltage ($V_{ref}$). The reference voltage ($V_{ref}$) may be selected based on the application.

In block 150 of FIG. 2, the controller is programmed to obtain a stator current modifier [$\Delta I_d$, $\Delta I_q$] based at least partially on the characteristic angle ($\theta_i$, i=1, 2, 3) and the flux weakening factor ($\Delta I_S$) such that:

$$\Delta I_d = (\Delta I_S * \cosine(\theta_i)); \text{ and}$$

$$\Delta I_q = (\Delta I_S * \sine(\theta_i)).$$

The controller 40 is operative to control at least one operating paramater of the electric machine 12 based at least partially on the stator current modifier [$\Delta I_d$, $\Delta I_q$], to achieve improved high speed current control and improved motor torque linearity.

In block 160 of FIG. 2, the controller 40 is programmed to obtain a modified stator current [$I_d^N$, $I_q^N$] based at least partially on the stator current modifier [$\Delta I_d$, $\Delta I_q$] and the base stator current [$I_d^{LU}$, $I_q^{LU}$] such that $I_d^N = (I_d^{LU} + \Delta I_d)$ and $I_q^N = (I_q^{LU} + \Delta I_q)$. The output of block 160 may be sent to a current regulator (not shown) for controlling the electric machine 12.

The controller 40 of FIG. 1 may be an integral portion of, or a separate module operatively connected to, other controllers of the assembly 10. The controller 40 (and proportional-integral (PI) regulator 60) of FIG. 1 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An electric machine assembly comprising:
   an electric machine including a stator configured to have a stator current;
   a controller operatively connected to the electric machine and configured to receive a torque command (T);
   wherein the controller has a processor and tangible, non-transitory memory on which is recorded instructions for executing a method of modifying the stator current for enhanced flux weakening, execution of the instructions by the processor causing the controller to:
   obtain a base stator current $[I_d^{LU}, I_q^{LU}]$, from a look-up table based at least partially on the torque command (T);
   obtain a characteristic angle ($\theta_i$, i=1, 2, 3) based at least partially on a value of the torque command (T) and the base stator current the characteristic angle ($\theta_i$, i=1, 2, 3) being at least one of a first characteristic angle ($\theta_1$), a second characteristic angle ($\theta_2$) and a third characteristic angle ($\theta_3$);
   wherein:
      if the torque command (T) is between the low torque threshold ($T_L$) and the high torque threshold ($T_H$), inclusive, the controller is programmed to obtain the third characteristic angle ($\theta_3$) based at least partially on the first characteristic angle ($\theta_1$), the second characteristic angle ($\theta_2$) and a ratio R, such that R=(|T|-$T_L$)/($T_H$-$T_L$) and $\theta_3$=[R*$\theta_1$+(1-R)*$\theta_2$];
   obtain a stator current modifier [$\Delta I_d$, $\Delta I_q$] based at least partially on the characteristic angle ($\theta_i$, i=1, 2, 3) and a flux weakening factor ($\Delta Is$);
   wherein the controller is operative to control at least one operating parameter of the electric machine based at least partially on the stator current modifier [$\Delta I_d$, $\Delta I_q$].

2. The assembly of claim 1, wherein the stator current modifier [$\Delta I_d$, $\Delta I_q$] is defined as: $\Delta I_d$=($\Delta Is$*cosine ($\theta_1$)) and $\Delta I_q$=($\Delta Is$*sine ($\theta_1$)).

3. The assembly of claim 1, wherein:
   if the torque command (T) is greater than a high torque threshold ($T_H$), the controller is programmed to obtain the first characteristic angle ($\theta_1$) defined as: $\theta_1$=($\beta\pm90$), such that $\beta$=a tan 2[$I_d^{LU}$, $I_q^{LU}$].

4. The assembly of claim 1, wherein:
   if the torque command (T) is less than a low torque threshold ($T_L$), the controller is programmed to obtain the second characteristic angle ($\theta_2$) based at least partially on a magnetic flux ($\lambda_m$), a d-axis inductance ($L_d$) and the base stator current [$I_d^{LU}$, $I_q^{LU}$] such that: $\theta_2$=a tan 2[$I_q^{LU}$, ($I_d^{LU}$-($\lambda_m$/$L_d$))].

5. The assembly of claim 4, wherein the electric machine includes a rotor and the magnetic flux ($\lambda_m$) is obtained from a look-up table based at least partially on a temperature of the rotor.

6. The assembly of claim 1, wherein the controller is further programmed to: obtain the flux weakening factor ($\Delta Is$) based at least partially on the torque command (T) and a DC link voltage;
   obtain a modified stator current [$I_d^N$, $I_q^N$] based at least partially on the stator current modifier [$\Delta I_d$, $\Delta I_q$] and the base stator current [$I_d^{LU}$, $I_q^{LU}$] such that $I_d^N$=($I_d^{LU}$+$\Delta I_d$) and $I_q^N$=($I_q^{LU}$+$\Delta I_q$).

7. The assembly of claim 6, wherein said obtaining the flux weakening factor ($\Delta Is$) includes:
   generating respective d-axis and q-axis command voltages based on the torque command (T) and the DC link voltage;
   generating a voltage magnitude based on the respective d-axis and q-axis command voltages;
   generating the flux weakening factor ($\Delta Is$) based on a comparison of the voltage magnitude and a predefined reference voltage.

8. The assembly of claim 6, further comprising:
   a battery pack operatively connected to the controller and configured to provide the DC link voltage; and
   a pulse-width-modulator (PWM) inverter operatively connected to the controller and the battery pack.

9. A method of modifying the stator current for enhanced flux weakening in an electric machine assembly, the electric machine assembly including an electric machine with a stator configured to have a stator current, a controller configured to receive a torque command (T), the controller having a processor and tangible, non-transitory memory, the method comprising:
   obtaining a base stator current [$I_d^{LU}$, $I_q^{LU}$] from a look-up table based at least partially on the torque command (T);
   obtaining a characteristic angle ($\theta_i$, i=1, 2, 3) based at least partially on a value of the torque command (T) and the base stator current the characteristic angle ($\theta_i$, i=1, 2, 3) being at least one of a first characteristic angle ($\theta_1$), a second characteristic angle ($\theta_2$) and a third characteristic angle ($\theta_3$);
   wherein obtaining the characteristic angle ($\theta_i$, i=1, 2, 3) includes:
      if the torque command (T) is between the low torque threshold ($T_L$) and the high torque threshold ($T_H$), inclusive, obtaining the third characteristic angle ($\theta_3$) based at least partially on the first characteristic angle ($\theta_1$), the second characteristic angle ($\theta_2$) and a ratio R, such that R=(|T|-$T_L$)/($T_H$-$T_L$) and $\theta_3$=[R*$\theta_1$+1-R*$\theta_2$];
   obtaining a stator current modifier [$\Delta I_d$, $\Delta I_q$] based at least partially on the characteristic angle ($\theta_i$, i=1, 2, 3) and a flux weakening factor ($\Delta Is$); and
   controlling the electric machine based upon the stator current modifier [$\Delta I_d$, $\Delta I_q$].

10. The method of claim 9, wherein the stator current modifier $[\Delta I_d, \Delta I_q]$ is defined as: $\Delta I_d=(\Delta Is*\text{cosine}(\theta_1))$ and $\Delta I_q=(\Delta Is*\text{sine}(\theta_1))$.

11. The method of claim 9, wherein obtaining the characteristic angle ($\theta_i$, i=1, 2, 3) includes:
   if the torque command (T) is greater than a high torque threshold ($T_H$), obtaining the first characteristic angle ($\theta_1$) defined as: $\theta_1=(\beta\pm90)$, such that $\beta=$ a tan 2 $[I_d^{LU}, I_q^{LU}]$.

12. The method of claim 9, wherein obtaining the characteristic angle ($\theta_i$, i=1, 2, 3) includes:
   if the torque command (T) is less than a low torque threshold (TL), obtaining the second characteristic angle ($\theta_2$) based at least partially on a magnetic flux ($\lambda_m$), a d-axis inductance ($L_d$) and the base stator current $[I_d^{LU}, I_q^{LU}]$ such that: $\theta_2=$ a tan $2[I_q^{LU}, (I_d^{LU}-(\lambda_m/L_d))]$.

13. The method of claim 9, further comprising:
   obtaining the flux weakening factor ($\Delta Is$) based at least partially on the torque command (T) and a DC link voltage;
   obtaining a modified stator current $[I_d^N, I_q^N]$ based at least partially on the stator current modifier $[I_d^N, I_q^N]$ and the base stator current $[I_d^{LU}, I_q^{LU}]$ such that $I_d^N=(I_d^{LU}+\Delta I_d)$ and $I_q^N=(I_q^{LU}+\Delta I_q)$.

14. The method of claim 13, wherein said obtaining the flux weakening factor ($\Delta Is$) includes:
   generating respective d-axis and q-axis command voltages based on the torque command (T) and the DC link voltage;
   generating a voltage magnitude based on the respective d-axis and q-axis command voltages;
   generating the flux weakening factor ($\Delta Is$) based on a comparison of the voltage magnitude and a predefined reference voltage.

15. An electric machine assembly comprising:
   an electric machine including a stator configured to have a stator current;
   a controller operatively connected to the electric machine and configured to receive a torque command (T);
   wherein the controller has a processor and tangible, non-transitory memory on which is recorded instructions for executing a method of modifying the stator current for enhanced flux weakening, execution of the instructions by the processor causing the controller to:
   obtain a base stator current $[I_d^{LU}, I_q^{LU}]$ from a look-up table based at least partially on the torque command (T);
   obtain a characteristic angle ($\theta_i$, i=1, 2, 3) based at least partially on a value of the torque command (T) and the base stator current $[I_d^{LU}, I_q^{LU}]$, the characteristic angle ($\theta_i$, i=1, 2, 3 being at least one of a first characteristic angle ($\theta_1$), a second characteristic angle ($\theta_2$) and a third characteristic angle ($\theta_3$);
   obtain a flux weakening factor ($\Delta Is$) based at least partially on the torque command (T) and a DC link voltage;
   obtain a stator current modifier $[\Delta I_d, \Delta I_q]$ based at least partially on the characteristic angle ($\theta_i$, i=1, 2, 3) and the flux weakening factor ($\Delta Is$) such that: $\Delta I_d=(\Delta Is*\text{cosine}(\theta_1))$ and $\Delta I_q=(\Delta Is*\text{sine}(\theta_1))$;
   wherein, if the torque command (T) is greater than a high torque threshold (TH), the controller is programmed to obtain the first characteristic angle ($\theta_1$) defined as: $\theta_1=(\beta\pm90)$, such that $\beta=$ a tan 2 $[I_d^{LU}, I_q^{LU}]$;
   wherein, if the torque command (T) is less than a low torque threshold ($T_L$), the controller is programmed to obtain the second characteristic angle ($\theta_2$) based at least partially on a magnetic flux ($\lambda_m$), a d-axis inductance ($L_q$) and the base stator current $[I_d^{LU}, I_q^{LU}]$ such that: $\theta_2=$ a tan $2[I_q^{LU}, (I_d^{LU}-(\lambda_m/L_d))]$;
   wherein, if the torque command (T) is between the low torque threshold (TL) and the high torque threshold (TH), inclusive, the controller is programmed to obtain the third characteristic angle ($\theta_3$) based at least partially on the first characteristic angle ($\theta_1$), the second characteristic angle ($\theta_2$) and a ratio R, such that $R=(|T|-T_L)/(T_H-T_L)$ and $\theta_3=[R*\theta_1+(1-R)*\theta_2]$;
   wherein the controller is operative to control at least one operating paramater of the electric machine based at least partially on the stator current modifier $[\Delta I_d, \Delta I_q]$.

16. The assembly of claim 15, wherein the controller is further programmed to:
   obtain a modified stator current $[I_d^N, I_q^N]$ based at least partially on the stator current modifier $[\Delta I_d, \Delta I_q]$ and the base stator current $[I_d^{LU}, I_q^{LU}]$ such that $I_d^N=(I_d^{LU}+\Delta I_d)$ and $I_q^N=(I_q^{LU}+\Delta I_q)$.

17. The assembly of claim 15, wherein said obtaining the flux weakening factor ($\Delta Is$) includes:
   generating respective d-axis and q-axis command voltages based on the torque command (T) and the DC link voltage;
   generating a voltage magnitude based on the respective d-axis and q-axis command voltages;
   generating the flux weakening factor ($\Delta Is$) based on a comparison of the voltage magnitude and a predefined reference voltage.

\* \* \* \* \*